United States Patent [19]

DiRusso

[11] Patent Number: 4,580,791
[45] Date of Patent: Apr. 8, 1986

[54] VARIABLE FRICTION SECONDARY SEAL FOR FACE SEALS

[75] Inventor: Eliseo DiRusso, Westlake, Ohio

[73] Assignee: The United States of America as represented by the Administrator, National Aeronautics and Space Administration, Washington, D.C.

[21] Appl. No.: 672,224

[22] Filed: Nov. 16, 1984

[51] Int. Cl.$^4$ ............................................. F16J 15/34
[52] U.S. Cl. ................................... 277/27; 277/28
[58] Field of Search ...................... 277/3, 27, 28, 96.1

[56] References Cited

U.S. PATENT DOCUMENTS

| 3,330,563 | 7/1967 | DePuydt et al. | 277/29 |
| 4,103,903 | 8/1978 | Capriotti et al. | 277/27 |
| 4,193,756 | 3/1978 | Leon | 432/3 |
| 4,351,574 | 9/1982 | Furukawa et al. | 308/3 A |
| 4,408,767 | 10/1983 | Kako | 277/27 |
| 4,447,063 | 5/1984 | Kotzur et al. | 277/28 |
| 4,471,964 | 9/1984 | Kotzur | 277/27 |
| 4,483,541 | 11/1984 | DeVenyi et al. | 277/27 |
| 4,529,209 | 7/1985 | Nii | 277/96.1 |

FOREIGN PATENT DOCUMENTS 645359  7/1962  Canada ............................ 277/28

Primary Examiner—Robert I. Smith
Attorney, Agent, or Firm—Gene E. Shook; John R. Manning

[57] ABSTRACT

Vibration and stability of a primary seal ring 18 is controlled by a secondary seal system 24. An inflatable bladder 26 which forms a portion of secondary seal varies the damping applied to this seal ring.

The amplitude of vibration of the primary seal ring 18 is sensed with a proximity probe 34 that is connected to a microprocessor in a control system 32. The bladder pressure is changed by the control system 32 to mitigate any sensed instability or vibration.

14 Claims, 1 Drawing Figure

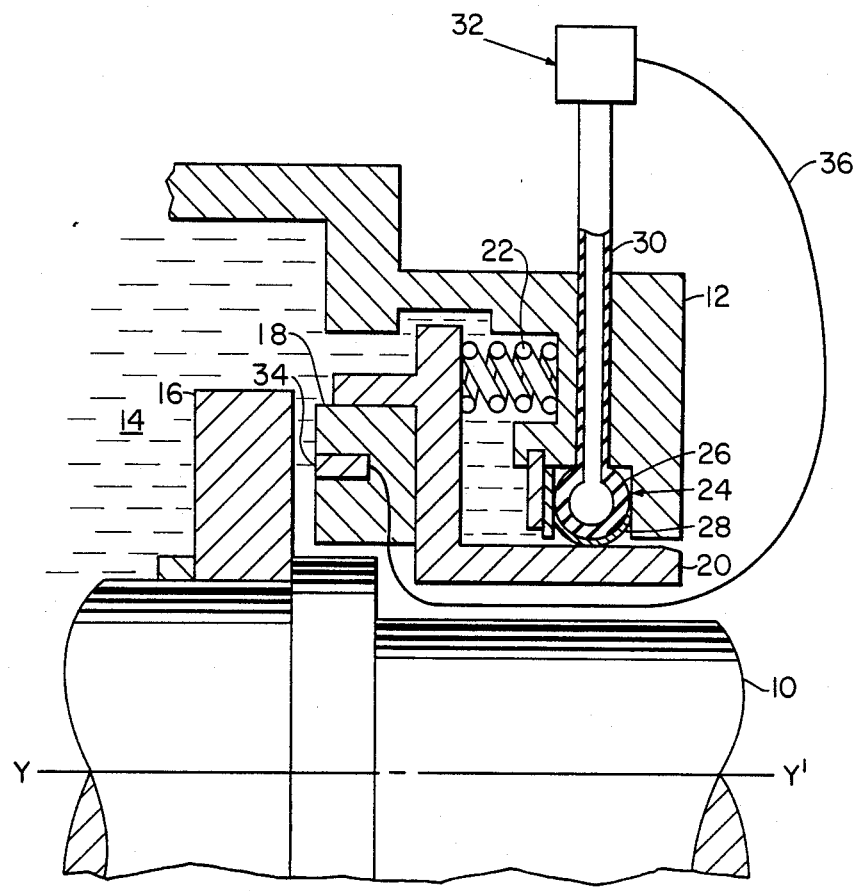

VARIABLE FRICTION SECONDARY SEAL FOR FACE SEALS

ORIGIN OF THE INVENTION

The invention described herein was made by an employee of the United States Government and may be manufactured and used by or for the government for governmental purposes without the payment of any royalties thereon or therefor.

TECHNICAL FIELD

This invention is concerned with improving self acting radial face seals of the type which operate with a very thin liquid or gaseous film between the primary seal faces. Face seals in general and particularly "self-acting" face seals are subject to instability caused by the vibration of the primary seal ring which may lead to excessive seal face wear or failure.

Face-type fluid seals are shaft seals generally comprising a nonrotating or stationary seal face and a rotor ring provided to rotate with the shaft and having a face opposing that of the stator seal, the opposing faces extending radially outwardly from the periphery of the shaft, thereby effecting a seal between the low-pressure and high-pressure regions of a surrounding and engulfing fluid. Radial face seals operate with extremely small gaps between the stationary or primary seal ring and the opposing face of the rotor ring or seal seat.

It is necessary that the tolerances for the existing space or gap be closely monitored so that the existing gap is held as closely as possible to its design value so as to avoid excessive fluid leakage or high friction loss. To realize this, the primary seal ring must be placed in a stabilized condition both under hydrostatic as well as hydrodynamic conditions. That is, proper equilibrium must be reached between high-pressure and low-pressure regions both under conditions when the liquids involved are at rest and to the pressures they exert or transmit as well as under conditions when motion of the fluids exert a force which acts on the elements of the seal immersed in the fluids.

Conventional radial face seals consisting of a primary seal ring or stator member and a rotor seal ring are inherently unstable. This instability is generally due to an angular misalignment brought about by a hydrodynamic effect establishing a pressure differential that produces a transverse moment which alters and disturbs the seal of the primary or stator seal ring. This pressure distribution produces dynamic instability that has a deterimental effect upon the resulting seal.

Prior art devices usually left the damping of primary seal ring vibrations to chance. When it was addressed, the damping was set to satisfy a given seal operating condition and could not be varied to accommodate different seal operating conditions or transient conditions. The disadvantage of such devices was that the seal vibrations were acceptable for only one design condition, and instabilities were encountered when seal conditions deviated from the design condition or when the seal was perturbed by transients.

In addition to the primary sealing face, all face seals have a secondary seal, typically in the form of piston rings or elastomeric "O" rings. The secondary seal functions to seal the secondary leak path in the face seal assembly.

BACKGROUND ART

U.S. Pat. No. 3,330,563 to De Puyt et al is directed to an inflatable seal structure where the seal is particularly useful in preventing the entry of water and dirt into bearing assemblies on boat trailer wheels.

U.S. Pat. No. 4,103,903 to Capriotti et al is concerned with a fluid accuated sealing arrangement. An accuating fluid is utilized for both biasing a rotatable sealing element into sealing association with a portion of a rotatable member and for providing the necessary lubrication of the rotatable sealing element.

U.S. Pat. No. 4,193,756 to Leon relates to a seal for a rotating apparatus, such as a rotary kiln. Pressurized bellows are employed to bias the seal.

U.S. Pat. No. 4,351,574 to Furukawa et al describes a load compensated type guide mechanism. A pressurized fluid is employed in response to a change in perpendicular displacement of a machine part with respect to a guide surface.

DISCLOSURE OF THE INVENTION

It is, therefor, an object of the present invention to provide apparatus for controlling the vibration and stability of a primary seal ring. Another object is to provide a secondary seal system which can vary the friction force or damping applied to the primary seal ring thereby controlling its vibration and stability.

According to the present invention an inflatable bladder forms not only a part of a secondary seal, but also the means to adjust the tightness of the secondary seal. An appropriate feedback mechanism is used to pump adequate amounts of fluid into this bladder.

The face seal's stability can be controlled as a function of primary ring vibration amplitudes. Also the friction can be remotely changed to achieve acceptable vibration amplitudes for a large range of seal operating conditions without compromising the secondary seal performance.

BRIEF DESCRIPTION OF THE DRAWING

The objects, advantages and novel features of the invention will be more fully apparent from the following detailed description when read in connection with the accompanying drawing which is an axial quarter section of a variable friction secondary seal constructed in accordance with the invention.

BEST MODE FOR CARRYING OUT THE INVENTION

Referring now to the drawing, there is shown a shaft 10 which rotates about its normal axis Y—Y'. The shaft 10 extends into a container 12 enclosing a body of fluid 14. The pressure of the fluid 14 is higher than the pressure outside the container 12. Loss of fluid 14 from the container 12 is prevented by a sealing apparatus of the face sealed type. The operation of such apparatus is discussed in U.S. Pat. Nos. 3,675,935, 4,260,166 and 4,291,877.

The face seal incorporates a rotatable seat 16 in the form of a shoulder mounted on the shaft 10. The seal further includes a primary seal ring in the form of an annular plate 18 through which the shaft 10 extends. The annular plate 18 is rigidly secured to a tubular carrier 20 in the form of a nose piece which is reciprocally mounted in the container 12.

A spring 22 biases the carrier 20 and annular plate 18 toward the rotatable seat 16. Rotation of the carrier 20 is prevented by conventional anti-rotation means.

A dam formed by the sealing engagement of the surfaces of the seat 16 and the annular plate 18 prevents leakage of the fluid 14. This engagement of the seat 16 and the annular plate 18 forms a face seal, and the surfaces are preferably optically flat.

During rotation of the shaft 10 the seal seat 16 and annular plate 18 are separated by a thin fluid film in a manner well known in the art. This is shown in the drawing.

The fluid film may encounter conditions in which it is unstable. For example, the annular plate 18 may vibrate through large amplitudes of fluid film thickness. This vibration causes intermittant contact of the seal seat 16 and the annular plate 18 which results in excessive seal wear and deteriorated performance.

According to the present invention a variable friction secondary seal 24 is incorporated into the sealing apparatus. This secondary seal 24 not only seals the leak path between the carrier 20 and the container 12, but also controls the stability of the primary seal ring in the event these vibrations become excessive.

This variable friction secondary seal 24 comprises an inflatable bladder 26 which engages a sealing member in the form of a secondary seal ring 28 that is mounted in the container 12. The secondary seal ring 28 has a tubular configuration and extends around the carrier 20.

An axial split line in the ring 28 enables the diameter of the ring to be selectively varied through a small predetermined range. The secondary seal ring 28 is maintained in sealing engagement with the carrier 20 by expansion of the bladder 26.

During rotation of the shaft 10 variable friction and, consequently, variable damping are achieved by selectively introducing variable amounts of air or the hydraulic pressure through a stem 30 extending from the bladder 26. This causes the bladder 26 to expand or contract thereby varying the pressure in the secondary seal ring 28. Such action alters the radial force and, consequently, the friction damping applied to the carrier 20.

In the event the seal film becomes unstable or the primary ring 18 begins to vibrate, the bladder pressure is changed to mitigate the instability or vibration. The bladder pressure is preferably changed by a feedback control system 32 which utilizes a microprocessor. The vibration amplitude of the primary seal ring is sensed by a proximity probe 34 mounted in the annular plate 18 and connected to the microprocessor through a lead 36.

The control system 32 then changes the bladder pressure to minimize or limit the primary ring vibration amplitudes to be within stable boundries. It is contemplated that the bladder pressure may be changed manually through a suitable valve means.

The secondary seal material may be selected to provide many different friction coefficients. Also coatings may be applied to the secondary seal ring to optimize the friction coefficient and sliding interface.

While the preferred embodiment of the invention has been shown and described it will be obvious that certain structural modifications may be made without departing from the spirit of the invention or the scope the subjoined claims.

I claim:

1. In apparatus for sealing a rotatable shaft extending into a container of fluid of the type having a seat member mounted on said shaft for rotation therewith and an annular member mounted on a tubular carrier member extending around said shaft in spaced relationship thereto and mounted on said container for a reciprocating movement toward and away from said seat along the axis of rotation of said shaft with means for biasing said annular member into engagement with said seat thereby forming a primary seal, the improvement comprising a secondary seal in said container in frictional engagement with said carrier member to accomodate the reciprocating movement thereof while preventing leakage of the fluid therebetween, and means for selectively varying the friction between said secondary seal and said carrier thereby controlling the stability of said primary seal.

2. Apparatus as claimed in claim 1 wherein said secondary seal comprises a ring member in engagement with said carrier member and an inflatable bladder in engagement with said ring and said container, and said friction varying means includes a control device for selectively varying the pressure within said bladder.

3. Apparatus as claimed in claim 2 wherein said ring member has an annular configuration for extending around said carrier member and an axial split line to enable the diameter thereof to be varied.

4. Apparatus as claimed in claim 2 including means for sensing instability of the primary seal and controlling the pressure within said bladder in response thereto.

5. In combination with a radial face seal of the type wherein a seat on a rotating shaft is separated from a non-rotating annular member on a carrier reciprocably mounted in a container by a film of fluid enclosed by said container, the improvement comprising means for selectively limiting the amplitudes of vibrations of said annular member when said seal film becomes unstable.

6. Apparatus as claimed in claim 5 wherein the vibration amplitude limiting means comprises a secondary seal mounted in the container for frictional engagement with said carrier to accomodate reciprocable motion, and means for selectively varying the friction of said secondary seal.

7. Apparatus as claimed in claim 6 wherein the secondary seal comprises a metal member for engaging said carrier and an inflatable bladder in engagement with said metal member and said container.

8. Apparatus as claimed in claim 7 wherein said metal member has an annular configuration and an axial split line to enable the diameter thereof to be varied.

9. Apparatus as claimed in claim 7 including means for controlling the pressure within said bladder in response to instability of said seal film.

10. Apparatus as claimed in claim 9 including a proximity probe for sensing the instability of said seal film.

11. Apparatus as claimed in claim 10 wherein the proximity probe is mounted in said ring member.

12. A secondary seal for use in combination with a primary seal of the type having a seat and an annular plate on a carrier member mounted on a container for reciprocating movement toward and away from said seat, said secondary seal comprising, a sealing member in engagement with said carrier member, an inflatable bladder in engagement with said sealing member and said container, and means for selectively controlling the pressure within said bladder thereby varying the friction between the carrier member and the container.

13. A secondary seal as claimed in claim 12 including means for sensing instability of the primary seal and controlling the pressure within said bladder in response thereto.

14. A secondary seal as claimed in claim 13 including a proximity probe for sensing instability of said primary seal.

* * * * *